United States Patent [19]
Crawford

[11] 3,931,630
[45] Jan. 6, 1976

[54] VIEWFINDER ASSEMBLY
[75] Inventor: James J. Crawford, Ringwood, N.J.
[73] Assignee: Frezzolini Electronics, Inc., Hawthorne, N.J.
[22] Filed: Aug. 20, 1974
[21] Appl. No.: 498,949

[52] U.S. Cl. .................................. 354/219; 354/223
[51] Int. Cl.² ...................... G03B 13/02; G03B 13/10
[58] Field of Search ........... 354/155, 219, 223, 224, 354/225, 295, 286, 220, 221, 222, 79; 350/244, 68

[56] References Cited
UNITED STATES PATENTS

| | | | |
|---|---|---|---|
| 1,987,041 | 1/1935 | Wood | 354/219 |
| 2,165,512 | 7/1939 | Schofield | 354/225 |
| 2,468,814 | 5/1949 | Contant et al. | 354/155 |
| 2,681,979 | 6/1954 | Manoloff | 240/10.68 X |
| 2,685,237 | 8/1954 | Dearstyne | 354/223 X |
| 2,858,751 | 11/1958 | Lopez | 354/219 X |
| 3,181,445 | 5/1965 | Reymond | 354/225 |

*Primary Examiner*—Robert P. Greiner
*Assistant Examiner*—E. M. O'Connor
*Attorney, Agent, or Firm*—Ryder, McAulay, Fields, Fisher & Goldstin

[57] ABSTRACT

A viewfinder assembly for a camera having a door for access to the interior wherein the viewfinder, when properly positioned to permit pictures to be taken, blocks the door. The assembly comprises a support barrel mounted on a camera lens and a main body section adapted to support optical elements therein. An eyepiece is at one end of the main body section and extends outwardly therefrom. The invention includes mounting means for rotatably mounting the main body section on the support barrel to permit rotation of the viewfinder assembly to a position wherein the door is no longer blocked.

7 Claims, 5 Drawing Figures

VIEWFINDER ASSEMBLY

This invention relates generally to a viewfinder assembly for a camera and, more particularly, pertains to a viewfinder assembly that may be moved out of the path of operating parts of a camera without disturbing the viewfinder settings.

In many cases, and in particular, expensive movie cameras, the lenses are manufactured by a completely different entity than the camera body per se. For example, the Angénieux Company of 42,570 St. Héand, Paris, France, produces a wellknown high quality lens for 16 mm cameras that are produced by a number of different camera body manufacturers. As a result of this diversity of manufacturing between lenses and camera bodies, it has been found that some unforeseen problems arise when a lens is mounted on a particular camera body.

For example, some camera bodies such as model No. LW-16 manufactured by Frezzolini Electronics Inc. of 7 Valley St., Hawthorne, N.J. 07506, are provided with a side opening door to permit access to the film transport mechanism for threading of the film. When the model 10 × 12 AV30 16 mm Angenieux lens is mounted on such a camera body, the eyepiece of the viewfinder is positioned in the path of movement of the door. Thus, to gain access to the transport mechanism either the lens must be removed from the camera body or the viewfinder must be removed by lossening the diopter adjustment knob and sliding the eyepiece off the barrel. Obviously, neither one of these solutions is particularly appealing. The lens is delicate and sensitive to mishandling and precious time may be wasted in removing and replacing the lens system each time the door is to be opened, particularly when a news event is being filmed. If the eyepiece rather than the lens is removed, the operator is required to readjust the eyepiece to obtain the correct diopter setting each time it is replaced, an equally time consuming task. Accordingly, an object of the present invention is to provide and improved viewfinder assembly.

A more specific object of the invention is to provide a movable viewfinder assembly which does not require resetting when moved.

Another object resides in the novel details of construction that provide a viewfinder assembly of the type described that is selectively movable out of the path of movement of a camera body door without disturbing any viewfinder settings.

Accordingly, the viewfinder assembly is for a camera having a door for access to the interior thereof and the viewfinder assembly is of the type that comprises a support barrel mounted on a camera lens. A main body section is adapted to support the viewfinder optical elements therein and an eyepiece is located at one end of the main body section and extends outwardly therefrom. The invention comprises mounting means for mounting the main body section on the support barrel for rotational movement between first and second positions so that the assembly may be moved out of the path of the operating parts of the camera when film is to be removed or replaced.

A feature of the present invention is to provide mounting means in a viewfinder assembly to permit movement of the viewfinder assembly out of the path of operating parts of the camera wherein the mounting means is fully compatible for use with existing viewfinder assemblies.

Other features and advantages of the present invention will become more apparent from a consideration of the following detailed description, when taken in conjunction with the accompanying drawings, in which.

Figure 1:
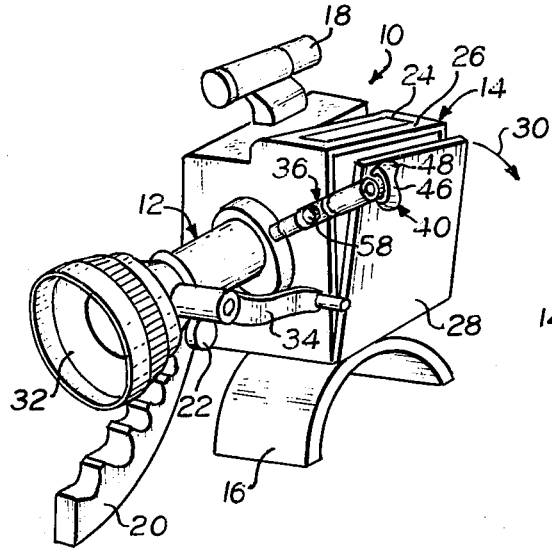
FIG. 1 is a perspective view of a camera employing a viewfinder assembly constructed according to the present invention, illustrating the viewfinder in normal door-blocking position for taking pictures.
Figure 2:
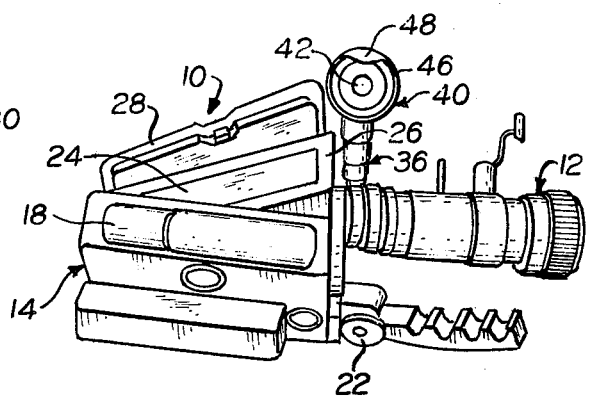
FIG. 2 is a perspective view of the camera shown in FIG. 1, as seen looking from above, illustrating the position of the viewfinder assembly after it has been rotated out of the path of movement of the camera door.

A viewfinder assembly constructed according to the present invention is adapted to be utilized in conjunction with a camera designated generally by the reference numeral 10 in FIGS. 1 and 2. The main elements of the camera 10 are a lens 12 and a camera body 14. The lens 12 is connected to the camera body 14 in any conventional manner as by screwing the threaded end of the lens into a threaded lens opening on the camera or by the utilization of a bayonet mount. The lens may comprise the aforementioned lens manufactured by the Angēnieux Company and the camera body 14 may comprise the aforementioned camera body manufactured by Frezzolini Electronics, Inc. The camera body 14 includes a curved shoulder mount 16, a handle 18, and a pistol grip 20 that may be adjusted in any desired position by a set screw 22. In the interest of clarity, the film magazine which is releasably received in a recess 24 in the top wall 26 of the camera body is not shown. The side wall 28 of the camera body is hingedly connected along the bottom edge by appropriate hinges (not shown) to the remainder of the camera body to provide a door that may be opened in the direction indicated by arrowhead 30 to permit access to the film transport mechanism (not shown) within the camera body. In other words, the door 28 must be opened each time a new film magazine is mounted on the camera to permit the film to be threaded through the film transport mechanism.

The lens 12 includes a hooded lens opening 32 and a zoom crank 34 mounted on the lens barrel. The crank 34 controls the zoom features of the lens. Extending radially outwardly from the lens barrel 12 is a viewfinder assembly designated generally by the reference numeral 36 which is constructed in accordance with the present invention.

Figure 3:
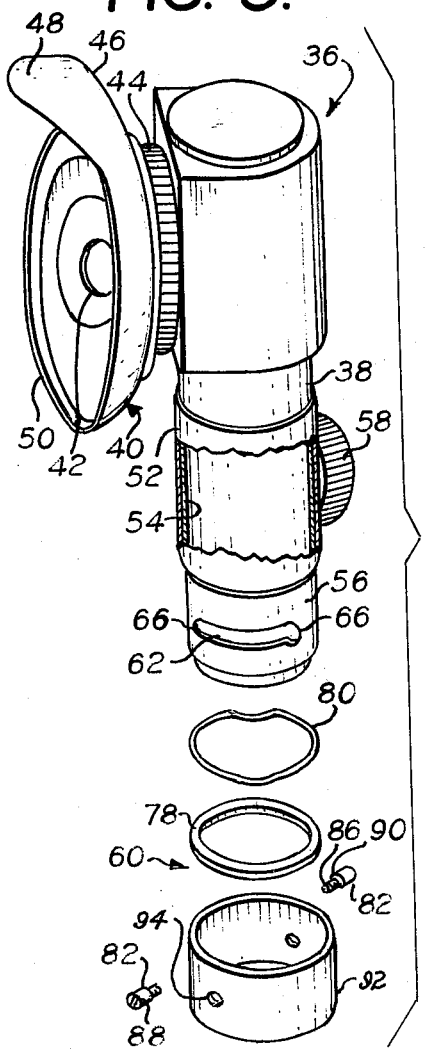
FIG. 3 is an exploded view of the viewfinder assembly of the present invention.

As shown more particularly in FIG. 3, the viewfinder assembly 36 comprises a main body section 38 having a laterally or outwardly extending eyepiece 40. Received within the main body section are the optical elements (not shown) of the view-finder assembly optical access to which is obtained through a lens opening 42 in the eyepiece. A rotatable knurled ring 44 controls a shutter mechanism that closes the lens opening 42 to prevent light from reaching the film. Surrounding the lens opening is an eye cup 46 having a laterally or outwardly extending integral portion 48 over a portion of its periphery. The eye cup 46 is conventional and operates to surround the eye of the operator when he is viewing through the lens opening 42 to shut out ambient light. For this reason, the edges 50 of the eye cup similarly extend laterally or outwardly.

The main body section 38 includes a hollow outer barrel section 52 which slidingly receives an inner barrel section 54 that terminates in an enlarged diameter lower piece 56 that abuts the lower edge of the outer barrel section 52 to limit the inward movement of the inner barrel section. The outer barrel is slidable with respect to the inner barrel and is fixed in place by a set screw 58 that is threadedly received in the outer barrel and is adapted to abut the surface of the inner barrel to prevent relative movement between the barrels. The movement between the outer barrel section and the inner barrel section permits the operator to adjust the diopter strength of the viewfinder to his own individual eyesight. Thus, in operation, the operator loosens the set screw 58 and moves the outer barrel 52 axially with respect to the inner barrel 54 until he achieves the desired focus whereupon he tightens the set screw 58.

Conventional viewfinder assemblies such as the assembly normally supplied with the aforementioned Angenieux lens, are immovably fixed in the orientation shown in FIG. 1 wherein the eyepiece 40 extends rearwardly with respect to the camera body 14. Of necessity, the viewfinder assembly must be positioned as close to the camera body is possible so that the weight of the camera will be supported by the operator while he looks through the viewfinder assembly. For cameras employing side-opening doors, a problem is presented since the rearwardly extending eyepiece 40 is directly in the path of movement of the door 28, as shown in FIG. 1. In other words, the door 28 cannot be opened to permit the camera operator to gain access to the film transport mechanism.

Heretofore, if the operator desired to open the door 28, he would have to remove the lens 12. This is an extremely cumbersome and time-consuming operation and, in addition, might very well disturb lens settings, thereby requiring the operator to recheck all settings when the lens was remounted. This type of procedure is unappealing to the operator particularly when it is realized that the cameras are used professionally to film news events where time is of the essence and film magazines must be changed in a matter of seconds. An alternative procedure is to loosen the set screw 58 and remove the outer barrel 52 from the inner barrel thereby also removing the eyepiece 40. However, this method is also time-consuming since the viewfinder assembly must again be adjusted by the operator to his individual eyesight each time a film magazine is changed. On the other hand, the present invention provides a novel mounting arrangement designated generally by the reference numeral 60, which permits the eyepiece 40 to quickly be moved out of the path of movement of the door 28 without disturbing any camera setting.

More particularly, the mounting arrangement 60 comprises two opposed elongated slots 62 and 64 on the circumference of the enlarged diameter portion 56 of the inner barrel section 54 of the main body section. Each slot extends over approximately one quarter of the circumference of the protion 56 or, to put this in another way, each slot extends through an arc of substantially 90°. The ends of the slots terminate in slightly enlarged bores 66 the diameters of which are slightly larger than the width of the slots so that the edges of the bores extend slightly above and below the respective upper and lower edges of the slots.

The lens 12 is provided with a radially extending support barrel 68 on which is mounted the viewfinder assembly. Surrounding a lower portion of the support barrel is a fixed ring 70 and a collar 72 surrounds the ring 70 and extends slightly above the edge of the ring to define an annular space 74 between the collar and the support barrel 68.

Figure 4:
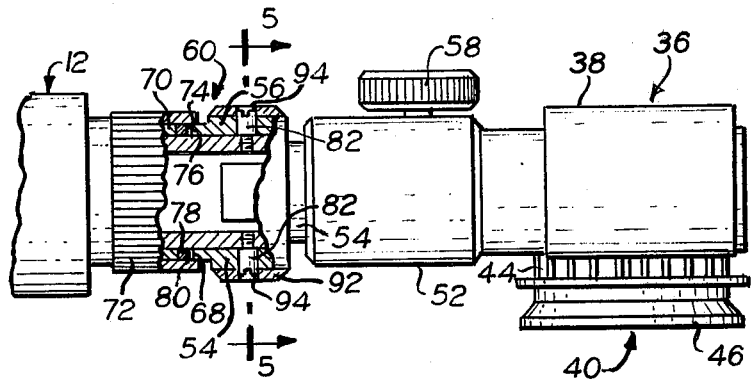
FIG. 4 is a front elevational view, partially in section, illustrating the connection of the viewfinder assembly to the camera lens.

The inner barrel 54 is slidingly and rotatably received on the support barrel 68 as shown in FIG. 4. The inner barrel is provided with a reduced diamer end portion 76 that is received within the space 74. Provided in the space 74 between the ring 70 and the bottom edge of the portion 76 of the inner barrel 54 there is a washer 78 and a leaf spring 80 which may be fabricated from a phosphor bronze alloy and is in the form of a washer. The spring 80 biases the main body section 38 of the viewfinder assembly outwardly from the lens 12 for reasons which will become apparent herein below.

Figure 5:
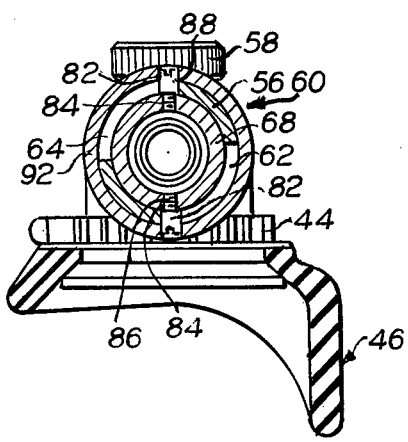
FIG. 5 is a sectional view of the viewfinder assembly taken along the line 5—5 of FIG. 4.

Screws 82 extend through the respective slots 62 and 64 and are threadedly engaged in threaded apertures 84 in the support barrel 68. As shown in FIGS. 3-5, the screws 82 are provided with a threaded shaft 86 and a smooth portion 88 of larger diameter than the shaft to define a shoulder 90 therebetween. The screws are threaded into the apertures 84 until the shoulders 90 abut the barrel 68. The screws are sized so that the smooth portion 88 extends through the respective slots 62 and 64 and slightly therebeyond. A collar 92 surrounds the enlarged diameter portion 56 of the barrel 54 and is provided with diametrically opposed through bores 94 into which the ends of the screws 82 project to maintain the collar in place. The collar 92 is provided to cover the slot 62 and 64 to prevent foreign material from entering the viewfinder assembly through the slots.

The slots are positioned so that when the screws 82 abut one end of the slots 62 and 64 the viewfinder assembly 36 will be oriented in the normal position as shown in FIG. 1. As noted above, the spring 80 biases the assembly outwardly so that the screws 82 abut the lower edge of the apertures 66 that terminate the slots 62 and 64. Since the lower edge of each aperture is slightly below the lower edge of the slot, the apertures act as detents to retain the viewfinder assembly in position.

When it is desired to open the door 28, a slight downward pressure is exerted on the top of the viewfinder assembly 36 to move the screws 82 into alignment with the respective slots 62 and 64. The viewfinder assembly is then rotated 90° to the position shown in FIG. 2. In other words, since the slots 62 and 64 extend through an arc of 90°, the viewfinder assembly is rotated until the screws 82 engage the other end of the slot. The pressure on the viewfinder assembly may then be released whereupon the spring 80 again biases the main body section 38 outwardly so that the screws 82 are now received in the apertures 66 at said other end of the slot, thereby providing a detent to retain the viewfinder assembly in the position shown in FIG. 2. Since the eyepiece 40 has now been moved out of the path of movement of the door 28, the door 28 may be opened so that access may be had to the film transport mechanism. When it is desired to move the viewfinder assembly into picture-taking position, the above procedure is simply reversed, so that the viewfinder assembly is rotated back to the position shown in FIG. 1.

Accordingly, a viewfinder assembly has been provided which is easily and quickly moved out of the path of operating parts of the camera without disturbing any setting on the camera.

While a preferred embodiment of the invention has been shown and described herein, it will become obvious that numerous omissions, changes and additions may be made in such embodiment without departing from the spirit and scope of the present invention.

What is claimed is:

1. In a camera of the type comprising a body, a camera lens connected to said body, and a side door on said camera body for access to the interior thereof; a viewfinder assembly comprising:
   a. a support barrel mounted on said camera lens;
   b. a circular main body section adapted to support optical elements therein;
   c. an eyepiece at one end of said main body section extending outwardly therefrom;
   d. said main body section having a normal operating position corresponding to a first position in which said eyepiece is positioned in the path of movement of said door and said eyepiece is oriented in viewing position;
   e. and mounting means for mounting said main body section for rotational movement between said first position and a second position in which said eyepiece is positioned out of the path of movement of said door to permit said door to be opened,
      i. said mounting means comprising at least one elongated circumferential slot in said main body section,
      ii. and a radially extending pin on said support barrel slidingly received in said slot to permit relative rotation between said main body section and said support barrel,
      iii. said slot being sized so that said main body section is oriented in said first position when said pin engages one end of said slot and said main body section is oriented in said second position when said pin engages the other end of said slot,
      iv. indexing means at the ends of said slot for releasably retaining said main body section in said first and second positions,
      v. said indexing means comprising enlarged openings at the ends of said slots and extending beyond said slot to provide detents,
      vi. and biasing means for biasing said main body section in a direction whereby said pin is received in said detents.

2. The viewfinder assembly of claim 1, in which said slot extends at least 90° about the circumference of said main body section.

3. The viewfinder assembly of claim 1, in which two opposed elongated 90° slots are provided in the circumference of said main body section, and radially extending pins on said support barrel received in respective ones of said slots.

4. The viewfinder assembly of claim 1, wherein the diameter of said main body section is greater than the diameter of said support barrel, and said support barrel is rotatably received within said main body section.

5. The viewfinder assembly of claim 4, and a collar surrounding said slotted main barrel section, a bore in said collar receiving said pin therethrough.

6. The viewfinder assembly of claim 1, in which said biasing means comprises a leaf washer abutting the bottom edge of said main body section.

7. The viewfinder assembly of claim 1, in which said pin comprises a screw having a threaded portion, a smooth portion, and a shoulder therebetween, said threaded portion being threadedly engaged with said support barrel, said shoulder abutting said support barrel, said smooth portion extending outwardly and being received in said slot.

* * * * *